Sept. 30, 1924.
W. W. CHAMBERLAIN
DUPLEX WIPER FOR WINDSHIELD
Filed June 7, 1924
1,510,041
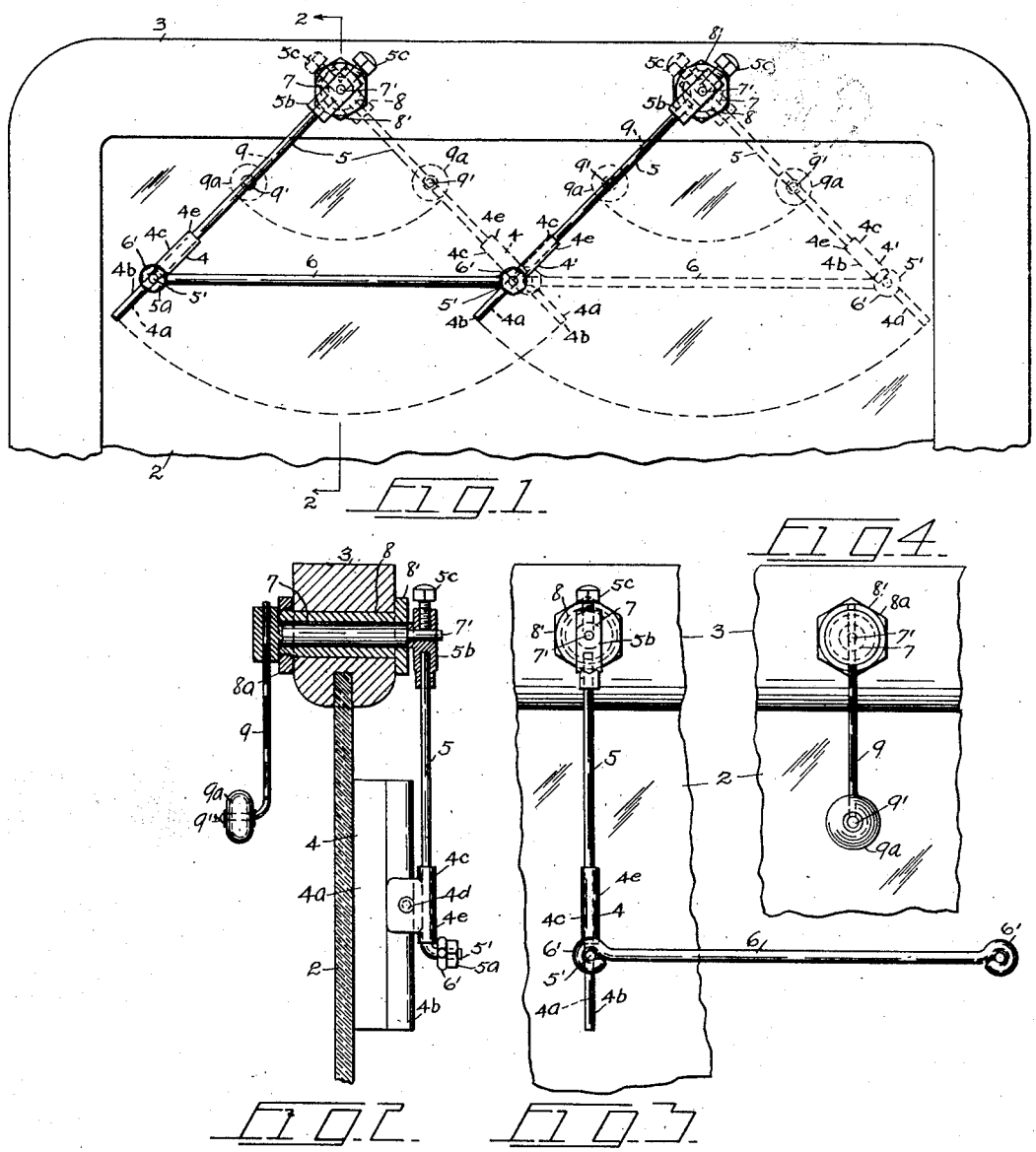
Inventor.
Walter W. Chamberlain
By Harry D. Wallace
Attorney.

Patented Sept. 30, 1924.

1,510,041

UNITED STATES PATENT OFFICE.

WALTER W. CHAMBERLAIN, OF WATERTOWN, NEW YORK.

DUPLEX WIPER FOR WINDSHIELDS.

Application filed June 7, 1924. Serial No. 718,543.

*To all whom it may concern:*

Be it known that I, WALTER W. CHAMBERLAIN, a citizen of the United States, residing at Watertown, in the county of Jefferson and State of New York, have invented certain new and useful Improvements in Duplex Wipers for Windshields, of which the following is a specification.

This invention relates to duplex wipers for wind-shields of automobiles and the like, and has for its object to provide novel, simple and effective means for wiping and cleaning the external surface of the windshield, during rainy, snowy and dusty weather. A further object is to provide spaced duplicate wiping members, which are arranged to be operated as one part; both of said wipers being pivotally supported by the frame of the wind-shield, and each being provided with a crank by which either the driver of the vehicle, or a passenger who sits beside him, may readily and conveniently operate the wipers, by a single operation. A further object is to provide means for connecting the twin wipers in a manner to effect identical oscillation of said parts when either of said cranks are manipulated; it being a particular object of the invention to provide a mechanism of the class, by which the greater portion of the relatively long transparent wind-shield may be wiped and kept clean, thereby affording a clearer vision ahead of the vehicle, as well as towards the opposite sides of the roadway, than is possible where a single wiping element is employed, as heretofore.

I attain these objects by the means set forth in the detailed description which follows, and as illustrated by the accompanying drawing, in which—

Figure 1 is a broken front side elevation of the transparent wind-shield, common to automobiles and like vehicles, to which my improvement is applied. Fig. 2 is an enlarged cross-section, taken on line 2—2 of Fig. 1. Fig. 3 is a broken front side elevation; showing one of the wipers and the tie-rod. And Fig. 4 is a broken rear-side elevation; showing one of the cranks by which the two wipers may be operated.

In the drawing, 2 represents the transparent wind-shield, and 3 is the usual frame by which the shield is supported.

4 and 4' represent the wiping members, which are preferably identical, both as to construction and operation. Each wiper consists of the usual relatively thin flexible rubber or like wiping brush or part 4ª, which is tightly clamped between the folds of a sheet metal holder 4ᵇ. The wiper and holder are directly supported by a clip 4ᶜ, which is pivoted to the holder by a rivet 4ᵈ; a portion of said clip being formed into a sleeve 4ᵉ, which normally parallels the back 4ᵇ, and through which a supporting and operating rod or arm 5 is inserted. The rod 5 is preferably fitted tightly in said sleeve, and has its lower end bent outwardly at right angles, for providing a threaded stud 5', which receives one of the loop-ends 6' of the tie-rod 6, the latter being held in place and allowed considerable swivel action, by means of a nut 5ª. The top end of the rocker arm 5 is inserted tightly in the lower end of a head or block 5ᵇ, which is bored out transversely to receive the reduced free end 7' of a rock shaft 7, by which the wiper is oscillated. A set-screw 5ᶜ is threaded into the top end of the head 5ᵇ, and engages the spindle 7', for adjustably holding the head and related parts in the proper positions, as shown. The shaft 7 is rotatable in a sleeve-bearing 8, which passes through a transverse opening 3' in the frame; the outer end of said sleeve having a head 8', while its inner end is threaded for receiving a nut 8ª, by which the sleeve may be rigidly clamped to the frame. The opposite or inner end of the shaft 7 is formed with a circular head 7ª, which is bored diametrically to receive the upper end of a crank 9, the latter preferably being driven tightly in said bore. The lower end of the rod 9 is preferably bent outwardly at right angles, as at 9', and is fitted with a hand-knob 9ª for manipulating the crank. The wipers 4—4', when tied together by means of the rod 6, may be oscillated simultaneously by the driver, or by a person occupying the same seat, by simply grasping the corresponding crank 9, and then swaying the same back and forth in a vertical plane, as shown by the full and dotted lines in Fig. 1. The wipers 4—4' are so constructed and arranged that the greater portion of the shield 2 may be wiped and kept clear, as shown by the arc-shaped dotted lines in Fig. 1.

My duplex wiper is extremely simple and may be constructed and installed at slight expense. It is designed preferably for manual operation, for supplying a demand for cheaper accessories, but may be actuated by any of the well-known power means, if desired.

Having thus described my invention, what I claim is—

A duplex wind-shield wiper for vehicles, comprising spaced depending wiper arms, the lower ends of said arms being bent outwardly and terminating in a threaded stud, wiping brushes mounted on said arms near said studs, shafts for pivotally supporting said arms journalled in the frame of the wind-shield, a tie-rod having its opposite ends swiveled to said outwardly bent portions for effecting the oscillation of said arms and brushes as one part, and crank rods carried by said shafts adapted to be used singly at the option of the driver or a passenger seated beside the driver for effecting the simultaneous oscillation of said brushes.

In testimony whereof I affix my signature.

WALTER W. CHAMBERLAIN.